US009415936B1

(12) United States Patent
Rodriguez et al.

(10) Patent No.: US 9,415,936 B1
(45) Date of Patent: Aug. 16, 2016

(54) STEPPED SPIRAL CHUTE ASSEMBLY HAVING FRICTION REDUCTION PANELS AND METHOD OF FORMING SAME

(71) Applicant: Alternative Engineering, Inc., Belmont, MI (US)

(72) Inventors: D. Robert Rodriguez, Ada, MI (US); John R. McClary, Comstock Park, MI (US)

(73) Assignee: Alternative Engineering, Inc., Belmont, MI (US)

( * ) Notice: Subject to any disclaimer, the term of this patent is extended or adjusted under 35 U.S.C. 154(b) by 0 days.

(21) Appl. No.: 14/622,721

(22) Filed: Feb. 13, 2015

Related U.S. Application Data

(60) Provisional application No. 62/031,323, filed on Jul. 31, 2014.

(51) Int. Cl.
*B65G 11/06* (2006.01)
*B65G 11/16* (2006.01)

(52) U.S. Cl.
CPC ............ *B65G 11/063* (2013.01); *B65G 11/163* (2013.01)

(58) Field of Classification Search
CPC ............................. B65G 11/06; B65G 11/063
USPC ............................................ 193/12; 198/778
See application file for complete search history.

(56) References Cited

U.S. PATENT DOCUMENTS 1,515,965 A * 11/1924 Pardee .................... B07B 13/11
193/12
1,928,459 A * 9/1933 Pardee ................. B65G 11/066
193/12
1,993,945 A * 3/1935 Peterson ................ B65G 69/00
193/12
2,437,259 A 3/1943 Kautz
3,513,956 A 5/1970 Rayment
3,565,226 A 2/1971 Winchester
4,222,482 A 9/1980 Kelley
4,418,813 A 12/1983 Leinenger
4,726,456 A 2/1988 Hugsett
5,083,651 A 1/1992 Wiese
5,598,914 A 2/1997 Sulzer et al.
7,641,034 B2 1/2010 Boustani
8,733,529 B2 5/2014 Heddles et al.

* cited by examiner

*Primary Examiner* — James R Bidwell
(74) *Attorney, Agent, or Firm* — Frank M. Scutch, III

(57) ABSTRACT

A helical chute system for conveying articles from an upper elevation to a lower elevation within a building includes a chute wound about a vertical axis and being secured at both an inner edge and outer edge by one or more support rods where a portion of the chute is comprised of a plurality of angular chute segments secured together in a stepped relationship to one another where each chute segment has a first surface sloping downwardly to a second surface below the first surface. An inner skirt is attached to the inner surface of the chute for preventing articles from falling from the surface of the chute and an outer skirt is attached to the outer surface of the chute for preventing articles from falling from the surface of the chute. One or more of plastic panels are positioned along the outer surface of the angular chute segments abutting the outer skirt. The number of low friction panels positioned on each angular chute segment is dependent on the height of the angular chute segment in the helical chute system such that the number panels per chute segment decreases in area as the chute segment descends about the vertical axis.

15 Claims, 12 Drawing Sheets

STEPPED SPIRAL CHUTE ASSEMBLY HAVING FRICTION REDUCTION PANELS AND METHOD OF FORMING SAME

CROSS REFERENCE TO RELATED APPLICATIONS

This application claims priority under 35 U.S.C. §119(e) to U.S. Provisional Application Ser. No. 62/031,323 entitled Stepped Spiral Chute Assembly Having Friction Reduction Panels and Method of Forming Same, filed Jul. 31, 2014 which is herein incorporated by reference in its entirety.

FIELD OF THE INVENTION

The present invention relates generally to packaging chutes and more particularly to a spiral packaging chute offering a stepped surface for packages and other objects moving across the chute.

BACKGROUND

Packing chutes are commonly used in industrial applications for moving boxes and other packages from various points. Most often, the chute has a smooth surface and is configured in a spiral configuration between different floors, or at different heights within a building. The packages move utilizing gravity from one point to the next. A problem with this approach is that no matter how low the resistance of the surface of the chute, boxes and other objects often get stuck as the surface friction is not high enough to provide continual motion. Although wheels or skate assemblies can be used to reduce friction, this often moves the package too fast through the chute to the extent that it must be slowed and/or caught with a net at its destination point. An example of a document conveying system is shown in U.S. Pat. No. 7,641,034 which is herein incorporated by reference in its entirety.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 8A is a magnified view of the of a bracket assembly as seen in FIG. 8.

Figure 1:
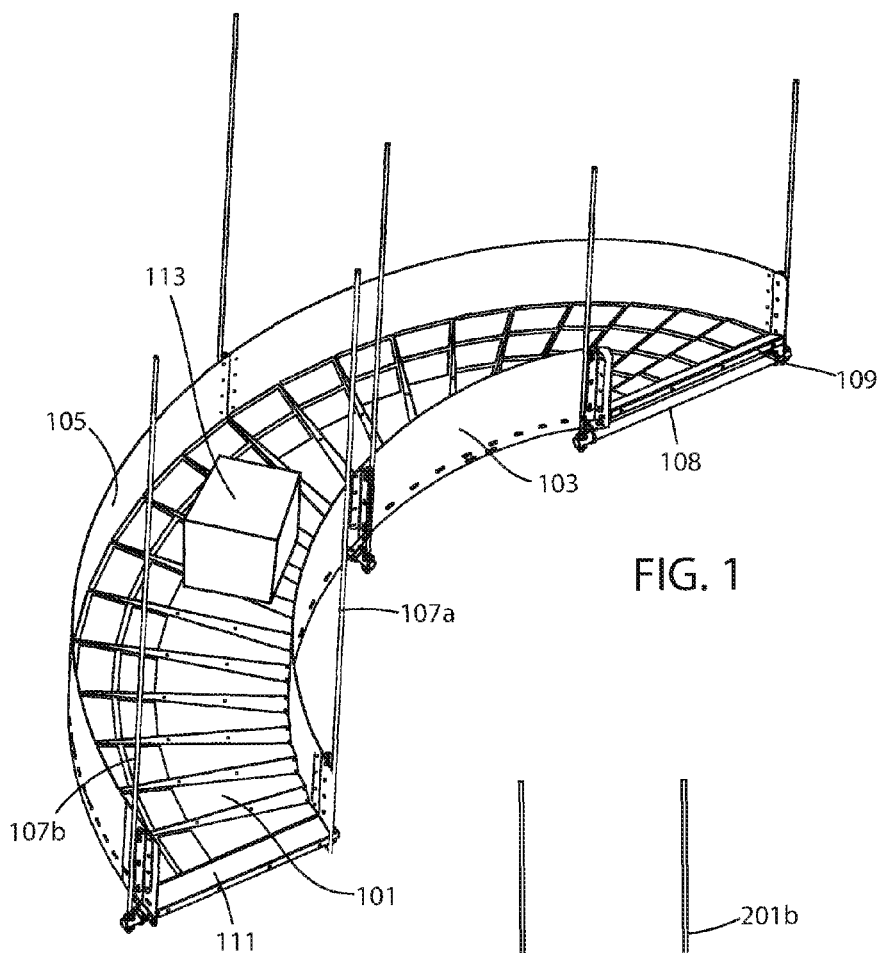
FIG. 1 is top perspective view showing a stepped spiral chute in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

SUMMARY OF THE INVENTION

A chute system for conveying articles, particularly boxes and documents, from an upper to a lower elevation within a building. The system includes a chute wound about a vertical axis and being secured at both an inner edge and outer edge by one or more support rods where a portion of the chute is comprised of a plurality of angular chute segments secured together in a stepped relationship to one another where each chute segment has a first surface sloping downwardly to a second surface below the first surface. An inner skirt is attached to the inner surface of the chute for preventing articles from falling from the surface of the chute while and an outer skirt is attached to the outer surface of the chute for preventing articles from falling from the surface of the chute. A plurality of plastic panels are uniquely positioned along the outer surface of the angular chute segments adjacent to the outer skirt where the number of plastic panels positioned on each angular chute segment is dependent on the height of the angular chute segment in the helical chute system such that the number plastic panels per chute segment decreases in area as the chute segment descends about the vertical axis. In one embodiment the chute system is supported using cables while in alternative embodiments the chute system is supported using a tower assembly or single pole.

DETAILED DESCRIPTION

Before describing in detail embodiments that are in accordance with the present invention, it should be observed that the embodiments reside primarily in combinations of method steps and apparatus components related to a stepped spiral packaging chute. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 is top perspective view showing a stepped spiral chute used 180 degree or less type configurations in accordance with an embodiment of the invention. The stepped spiral chute 100 includes a plurality of stepped segments 101 forming a channel for packages, envelopes and other parcels to be easily transported between different elevations such as floors of a building. An outer skirt 103 and inner skirt 105 are formed on the respective outer and inner sides of the stepped segments 101. The outer skirt 103 and inner skirt 105 are generally raised above the surface of the stepped segments 101 forming an orthogonal boundary for preventing packages and envelopes from leaving the surface of the stepped segments 101. The outer skirt may include a tape on its surface for slowing articles which come into contact with the skirt. As seen in FIG. 1, the stepped spiral chute 100 is formed about a central axis of rotation where papers, envelopes, boxes and other articles 113 move down the spiral chute 100. The articles may be of any configuration or nature but chute 100 is designed particularly to convey light documents and more particularly paper documents that are enclosed in envelopes, bags or the like.

In this embodiment, a plurality of support rods 107a, 107b are used to support the stepped spiral chute 100 by the floor structure directly above the chute. Those skilled in the art will recognize that a central post, cables or other types of support structures can also be used to securely hold the stepped spiral chute 100 while suspended in position. Each of the plurality of support rods 107a, 107b connect to a supporting bar member 108 that extends under the surface of the stepped segments 101. The support rods 107a 107b are adjusted to specific lengths to provide support for the stepped spiral chute 100. In an alternative embodiment, a substantially flat unstepped section of chute, such as start section 109 and end section 111, may also be placed at both the top end and bottom end of the stepped segments. The start section 109 works to provide a starting surface to place envelopes, boxes and other packages before they are thrust into the downward pitch of the stepped segments 101. The end section 111 operates to slow envelopes and boxes moving along the surface of the stepped segments 101 so that can be moved or directed to a receiving area. The end section 111 offers an advantage by avoiding the use of stopping bands, nets or other devices to slow a fast moving box 113. As herein described with regard to FIG. 3, the outer surface of the stepped segments 101 includes a plurality of friction reduction tiles or panels placed on the stepped segment whose number is based on the height of the stepped segment in the stepped spiral chute 100. In still other embodiments, a center pole can be used to provide support so that a tight center radius can be achieved having 6 inch to 18 inch in diameter supported using horizontal arms.

Figure 2:
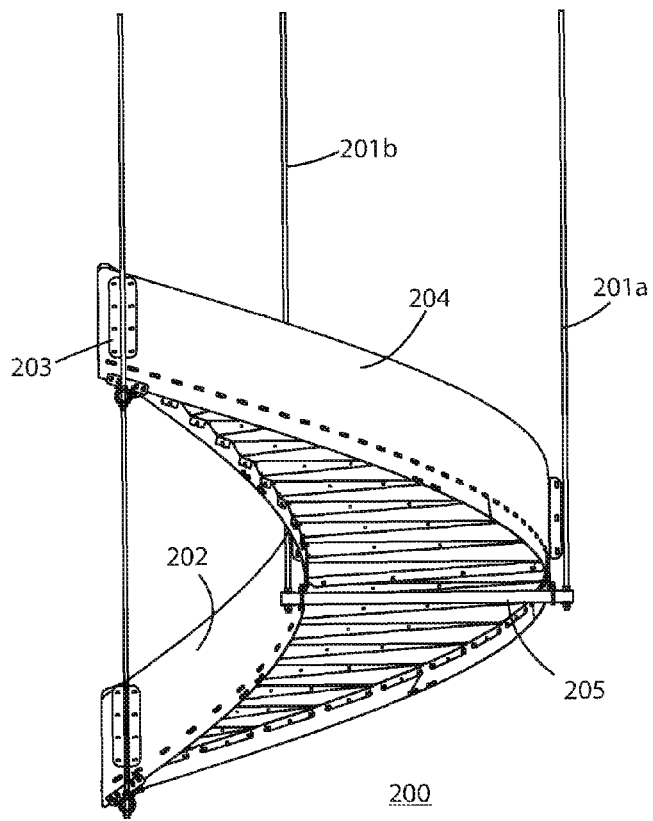
FIG. 2 is side perspective view of the stepped spiral chute shown in FIG. 1.

FIG. 2 is side perspective views of the stepped spiral chute 200 shown in FIG. 1. As seen in FIG. 2, a plurality of rods are shown attached to a supporting bar member. For example, rods 201a, 201b may be attached to the ceiling at one end and also attach to the supporting bar 205 at its opposite end. As seen in FIG. 2, a plurality of support rods 201a, 201b work with an accompanying supporting bar member 205, positioned under the stepped segments, for holding and/or supporting the spiral chute 200 into a rigid and fixed position. Although illustrated herein using rods, cable assemblies or any alternative means of support may also be used. Further, the bracket(s) 203 is affixed to the outside vertical surfaces of inner skirt 202 and outer skirt 204. The bracket 203 works to hold sections of the vertical surfaces firmly together in a rigid position.

Figure 2A:
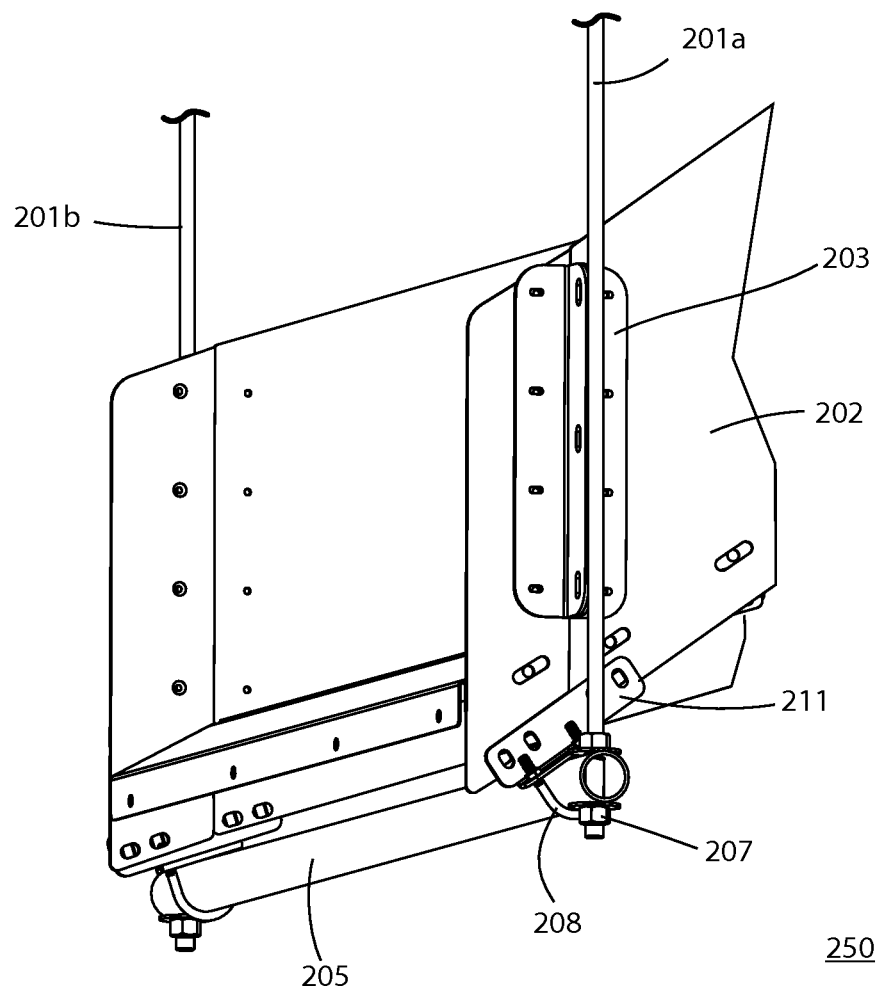
FIG. 2A is a magnified perspective view illustrating a supporting bar member used in connection with the 180 degree spiral chute.

FIG. 2A is a magnified perspective view illustrating the support rod assembly used in connection with a 180 degree or less spiral chute. The support rod assembly 250 utilizes support rods 201a, 201b that are fastened to the supporting bar member 205. An end of the rod is threaded such that screws are used to fasten the rod 201 to the supporting bar member 205. One or more brackets 203 work to fixedly attach to the sides of outer skirt 204 and inner skirt 202 and hold sections of the skirt together in a substantially vertical spiraling orientation. As seen in FIG. 2A, the rod 201a is shown passing through an end of the supporting bar member 205. Further, the supporting bar member 205 is attached to the outer skirt 204 using a U-bolt 208 that fastens through an end bracket 211. The enables the support rod assembly 250 to hold the section of spiral chute into a fixed and rigid position while also supporting boxes and other articles moving rapidly along the chute.

Figure 3:
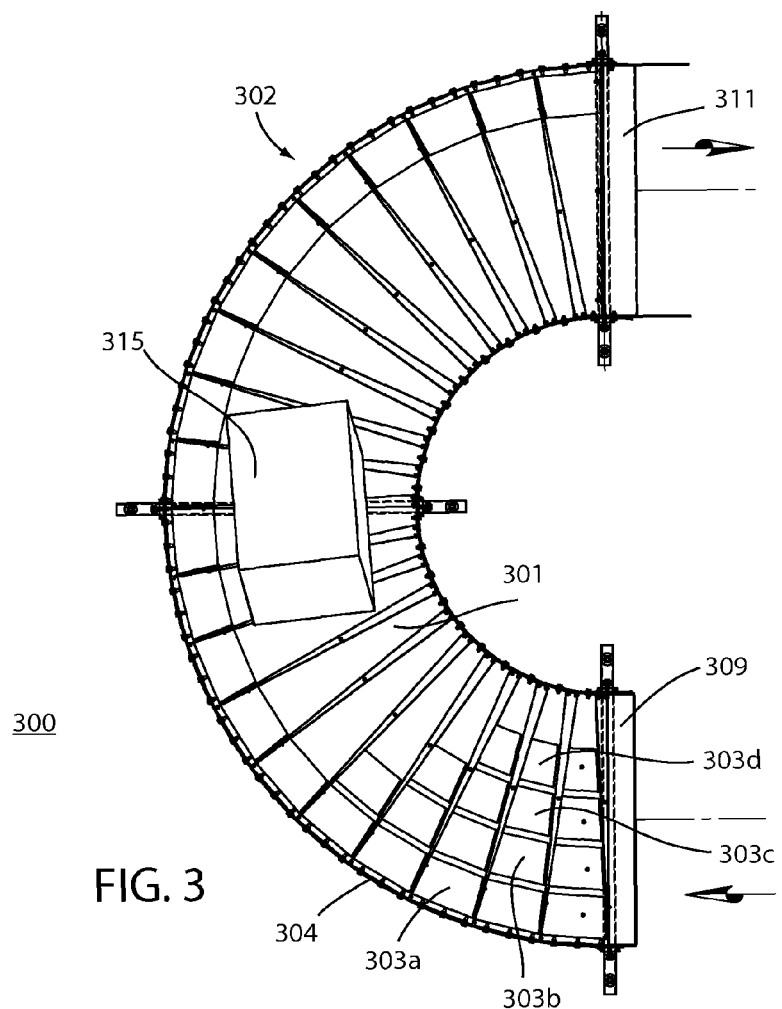
FIG. 3 is a top view of the stepped spiral chute shown in FIG. 1.

FIG. 3 is a top view of the stepped spiral chute shown in FIG. 1. The stepped spiral chute 300 includes a start section 309 that is joined with a plurality of stepped angular chute segments 301. The appearance of the stepped angular chute segments 301 resemble metallic "shingles" that spirally extend from a higher elevation to lower elevation. Positioned atop the surface of the chute segments 301 are a plurality of low friction panels 303a, 303b, 303c, 303d. The low friction panels 303a, 303b, 303c, 303d are sized so they may be mounted side-by-side adjacent to the outer skirt 304. As seen in FIG. 3, the number of plastic panels positioned on each angular chute segment 301 is dependent on the height of the angular chute segment in the helical chute system such that the number plastic panels per chute segment decreases in area as the particular chute segment descends about the vertical axis. For example, FIG. 3 shows four (4) panels 303a, 303b, 303c, 303d positioned in a row at the upper elevation of the chute. As the article, such as box 315 moves over the angular chute segments 301, the number of panels decreases to three (3) panels 304a, 304b, 304c at some predetermined point. Similarly, as the elevation is lowered, two panels and then only one (1) panel per chute segment is used before joining the end section 311. In use, the article starts at start section 309 and moves along the panels at some predetermined velocity depending on the box's weight. By decreasing the number of panels as the article moves lower in elevation, this enables an article such as box 315 to gradually slow down as it approaches the end section 311. This increases safety and allows persons working in the area of the end section 311 additional time to lift and/or direct the article to the proper area. The use of the low friction panels 302 is also beneficial when conveying light objects such as envelopes and light paper products. As centrifugal force moves the light object outwardly to the outside edge of the spiral chute, the panels enable the light object to continue moving across the surface of the chute segment 301 as the surface friction is substantially low preventing the light object from stopping as in the case of the metallic surface.

Figure 4:
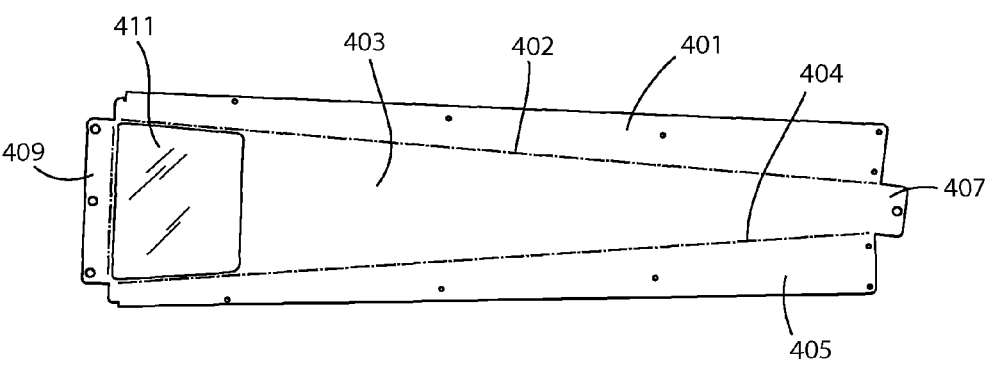
FIG. 4 is a top view of a section of the stepped spiral chute shown in FIG. 1.

FIG. 4 is a top view of a section of the stepped spiral chute shown in FIG. 1. In accordance with a specific feature of the present invention, the spiral chute is formed from a plurality of trapezoidal shaped segments 400 that are secured together in end-to-end relation. As described herein the plurality of segments are bilaterally supported and wind around a central axis through substantially 360 degrees. The stepped spiral chute is assembled and/or constructed by securing a plurality of individual chute segments 400 to each other and securing those segments 400 to the support rods as described herein. An advantage of using the step spiral chute as described herein, is that the structure may be glued or bolted together without the use of mechanical rivets or welds.

As seen in FIG. 4, a chute segment 400 is typically formed from a unitary metallic member that is configured in a manner to include a upper wall 401, middle section 403 and lower wall 405. The middle section 403 forms a substantially trapezoidal shape which makes the chute size and pitch easy to change by adjusting the dimension of one of more of the four sides of the trapezoid during manufacture. Using a trapezoidal shape allows the chute system to be designed to bend around a very tight radius or alternatively a wide radius. This has the benefit of providing an infinite number of chute sizes and pitch angles depending on specific location. Bend lines 402 and 404 provide a ridge or peak upon which an envelope, box or other article makes contact while moving through the chute. Thus, the envelope, box or other article moving on the chute surface makes tangential contact at a single point across each of the bend lines 402, 404 while moving through the downwardly spiraling chute. Each of the chute segments 400 includes an inner flange 407 and a outer flange 409 that are used for securing the chute segment 400 to the inner skirt and outer skirt respectively. Additionally, one or more low friction panels 411 are positioned side-to-side adjacent to the outer skirt on the middle section 403 of the chute segment 400. By way of example and not limitation, the low friction panels may be typically manufactured of Durasurf™ material which is a black plastic ultra-high molecular weight (UHMW) polyethylene. A material such as DuraSurf™ combines the greatest impact strength of any thermoplastic, with a low coefficient of friction and tremendous abrasion resistance. Each panel 411 can be to provide a super low friction surface for small articles such as paper sheet, envelopes and small boxes. The panels 411 are placed at the outer perimeter of the middle section 403 and their number is selected on the desired speed of the article based on height of the segment 400 in the chute. Thus, the outside lane (6-12 inches) of a segment 400 generally has a shallow angle (10-15 degrees) and will include self-adhesive UHMW to reduce friction as products are forced to the outside lane with centrifugal forces thus slowing down products from gaining to much speed from two reaction namely the reduced pitch angle which reduces speed and contact with the outside skirt which acts as a brake by increasing friction of the moving article.

Figure 5:
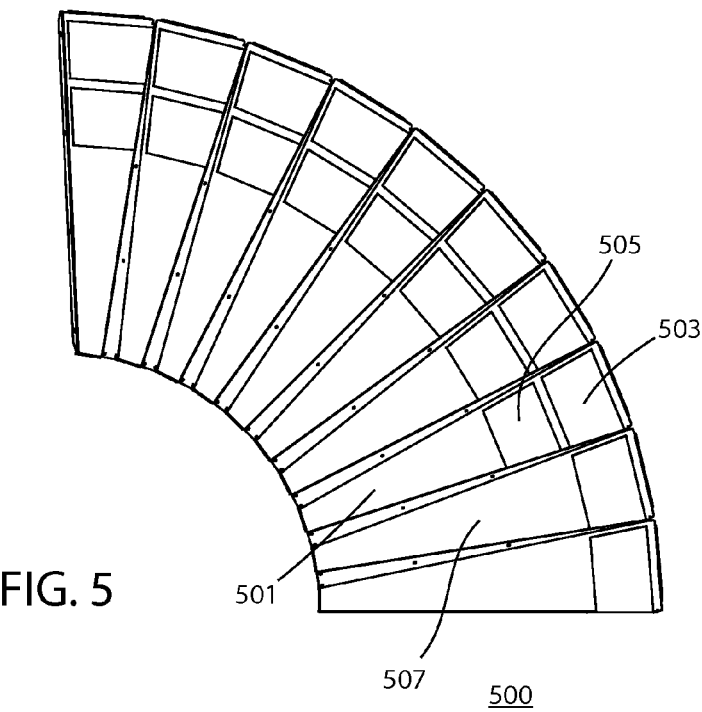
FIG. 5 is a top view of ten sections of stepped spiral chute connected side-to-side illustrating a partial turn of the spiral.
Figure 6:
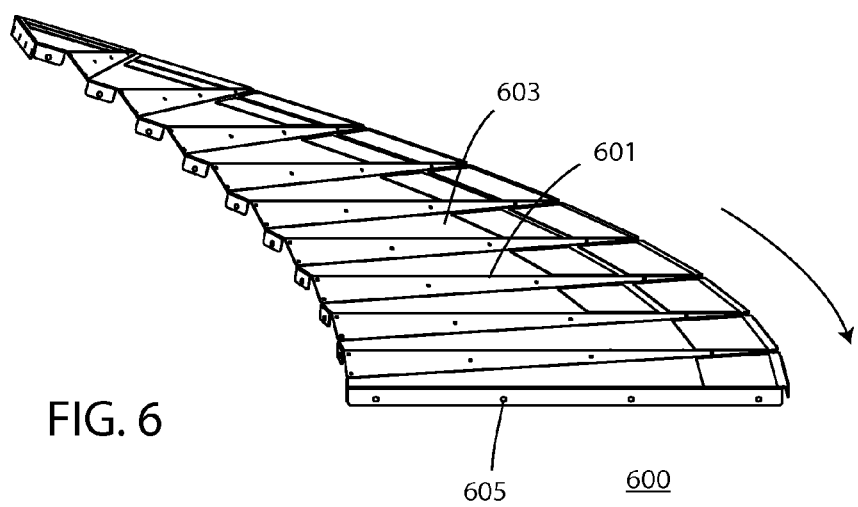
FIG. 6 is a perspective view of the stepped spiral chute illustrating its downward pitch for moving articles.

As seen in FIG. 5 and FIG. 6, a plurality of chute segments 501 are connected together in such a way that they resemble a stepped, spiral staircase, that can be arranged in a 180 or 360 degree downward slopping helix. FIG. 5 illustrates a first chute segment 501 having a set of two low friction panels 503, 505 placed thereon, chute segment 507 is lower in elevation and a transition is made to one panel per chute segment. As seen in FIG. 6, the chute 600 operates like a series of steps in a staircase where the segment 601 and segment 603 are situated at the junction of each pair of adjacent chute segments. Pairs of adjacent segments, such as segment 601 and segment 603 are secured together in end-to-end relation by a suitable means such as through the use of screws, connectors or welding. When secured together, the stepped spiral chute 600 resembles a continuous staircase that spirals through 180 degrees or more such that the chute segments, can be oriented about a central axis the spiral in either of a clockwise and counterclockwise direction. Those skilled in the art will further recognize that segments can also be made for incremental degrees of rotation for example segments turning 10 to 15 degree segments as compared with 90 to 180 to 360 degree segments as shown in the prior art. Moreover, chutes are made to convey articles at shallowest pitch angle. If the chute is too steep, articles on the chute may achieve excessive speeds. As described herein, the chute will be made with pitch angles ranging from 10 to 20 degrees for the outside wall and 30 to 55 degrees for the inside wall.

Figure 7:
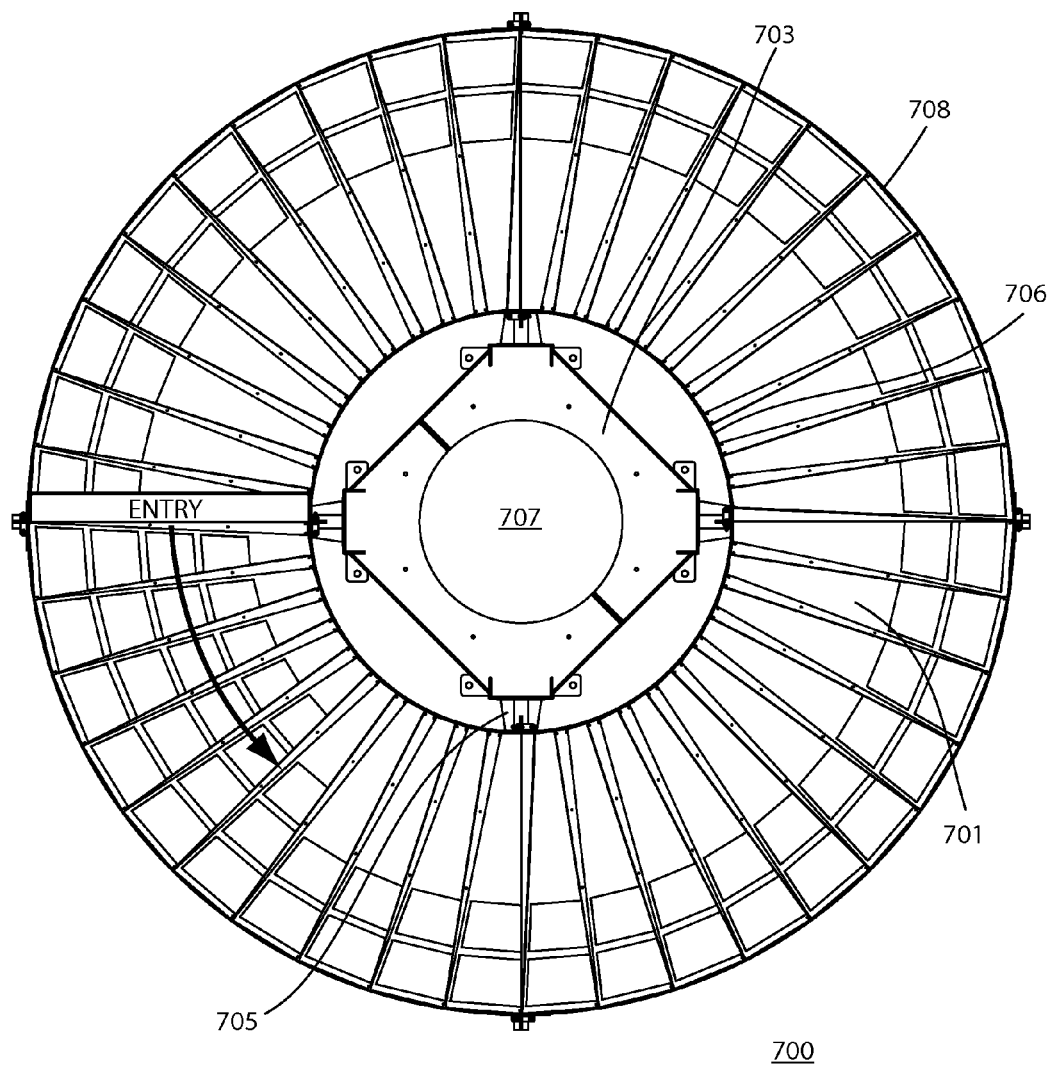
FIG. 7 is a top view of a 360 degree spiral chute according to an alternative embodiment of the invention.

FIG. 7 is a top view of a 360 degree spiral chute assembly according to an alternative embodiment of the invention. Although shown herein as a 360 degree spiral chute, chutes having a less or greater degrees of turning radius are also possible and would be similarly using only screws and bolts as fasteners. As described herein, the 360 degree spiral chute assembly 700 is formed by joining a plurality of stepped segments 701 in circular juxtaposition, using through holes 605, with mechanical fasteners such as screws, so as to form a downward spiral packaging chute. The stepped segments somewhat resemble stepped metallic "shingles" and are typically bolted together in-seriatim to form a desired 90 degree, 180 degree, 360 degree or 720 degree chute structure. As described herein, an inner wall 706 and outer wall 708 are fastened to the chute so as to keep packages and envelopes within the chute assembly. The assembly includes a vertical tower assembly having a tower frame 703 and four tower legs positioned under the tower frame. An advantage of such a structure is that it can support a substantially high weight load. A plurality of support brackets 705 extend circumferentially around the tower legs, typically each 90 degrees, in a descending manner. The support brackets extend outwardly and work to provide structural support for the stepped segments 701 as the spiral chute assembly extends downwardly about the tower assembly. Although shown spiraling downwardly in a counter-clockwise manner, those skilled in the art will further recognize that the downward spiral may also be formed in a clockwise direction. Further, at the center of the tower frame 703 is a void or opening 707 is shaped for allowing the tower frame 703 to be positioned around a standard size vertical building pillar (not shown). Additionally, the use of a tower assembly with support brackets allows the chute sections to be substantially level in relation to the ground with a very shallow pitch angle. This reduces friction with the outside wall since the reduced speed will not roll or tumble which could damage the box or other article.

Figure 8:
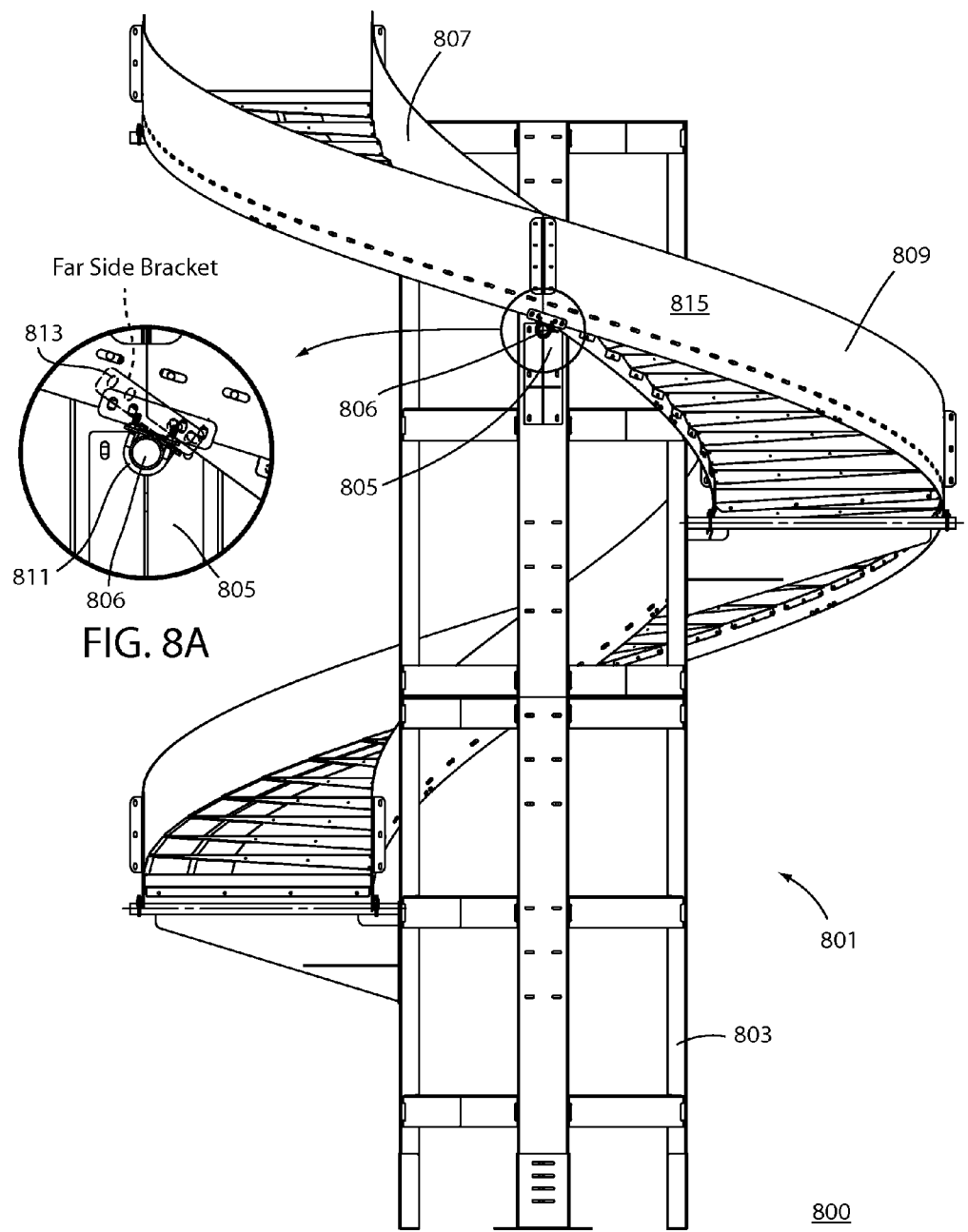
FIG. 8 is a first side view illustrating a 360 degree spiral chute attached to a lattice tower structure.
Figure 9:
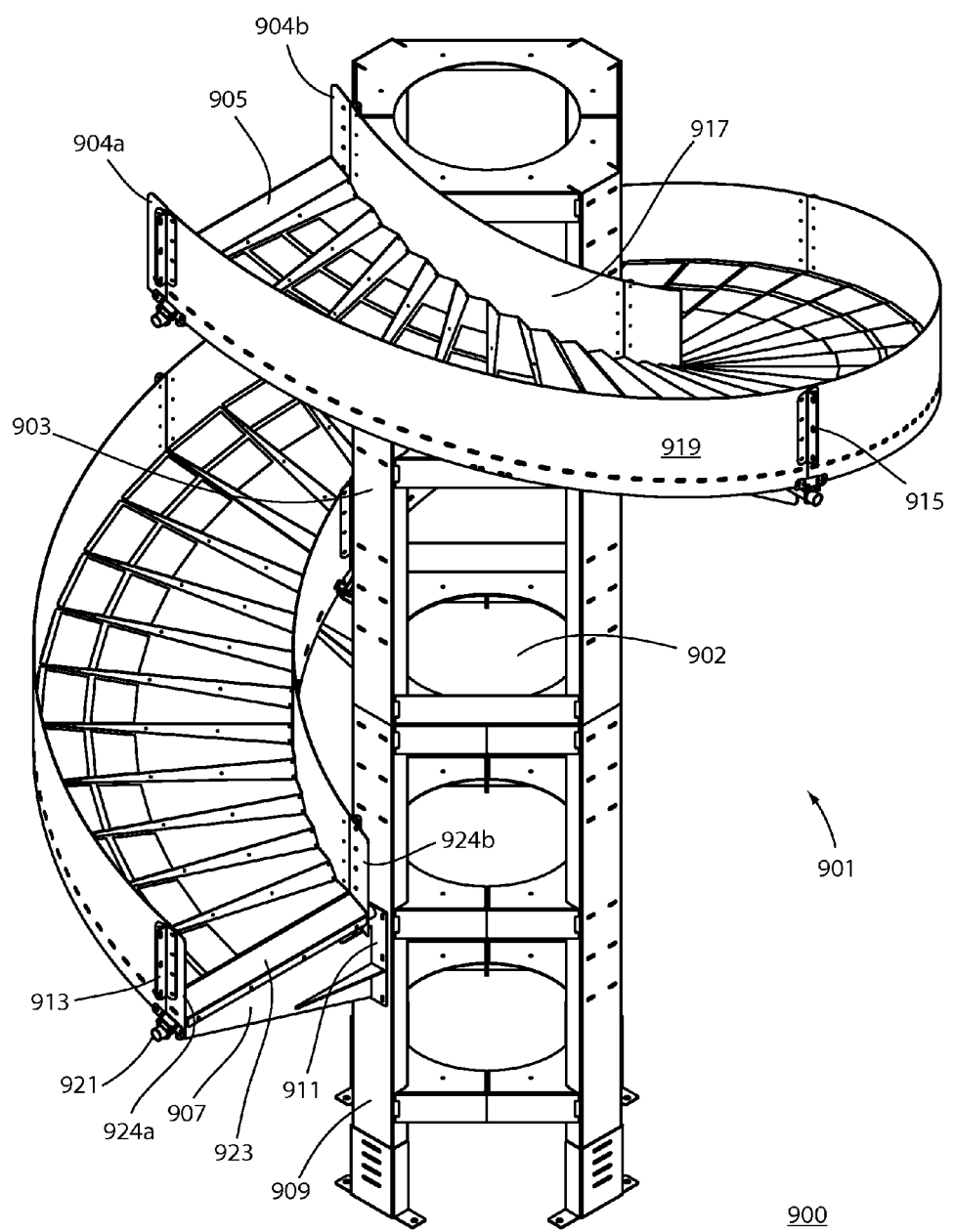
FIG. 9 is a second side view illustrating a 360 degree spiral chute attached to a tower structure.

FIG. 8, FIG. 8A and FIG. 9 are first and second side views respectively illustrating first and second side views of a 360 degree spiral chute attached to a tower structure. As seen in FIG. 8, a first view of the tower structure 800 includes a plurality of legs 803 that are positioned in a substantially square or box shape to form the vertical tower structure 801. Extending laterally from the tower structure 801 are a plurality of support arms 805. As seen in the magnified view FIG. 8A, the arms 805 extend from each tower leg in a staggered fashion such that a support arm is positioned at each 90 degrees below an adjacent support arm as they chute winds around the tower structure 801. In use, each support arm 805 extends under a portion of the descending chute assembly which includes the inner wall 807, chute segments and outer wall 809. Positioned at each end, on top of the support arm 805, are a plurality of tubular attachment sections 806 that are used for fastening a U-bolt fastener 811 and an attachment bracket 813 to both the inner wall 807 and outer wall 809. The attachment bracket 813, fastens to the respective surfaces of the inner wall surface and outer wall surface 815 for holding that portion of stepped segments in the spiral chute into a fixed position. As seen in the magnified view of FIG. 8A, the attachment bracket 813 is fixed to a lower edge of the outer wall surface 815 substantially parallel to the edge of the outer wall 809 using at least two screws or other attachment means used with the cylindrical attachment section. Although not shown in FIG. 8, the spiral chute is also affixed to the inner wall 807 in a similar fashion using an inner bracket and U-bolt fastener.

FIG. 9 illustrates a second view of the tower structure shown in FIG. 8. In this view, the spiral chute assembly 900 is shown spiraling around the tower structure 901. The void 902 within each tower frame 903 is seen for allowing a pillar to extend therethrough. At the entry of the spiraling chute 901, is in entry wall 904a, 904b. The entry wall 904a, 904b works in combination with an entry chute 905 to prevent any sharp exposed edges of the entry stepped chute section from being exposed to the user of the chute. A support arm 907 extends from the tower leg 909 to be fastened to an inner attachment bracket 911 and outer attachment bracket 913. Moreover, one or more splice brackets 915 are used to join the inner wall 917 and the outer wall 919 together to form a contiguous chute assembly with no breaks or gaps. At the end of the chute 901 is an exit wall 924a, 924b that works in combination with an exit chute 923 for preventing the user from being exposed to any sharp edges of the exit stepped chute sections. Those skilled in the art will recognize that items 904, 905, 923, 924 can be sized to seamlessly attach to a customer's adjacent equipment.

Figure 10:
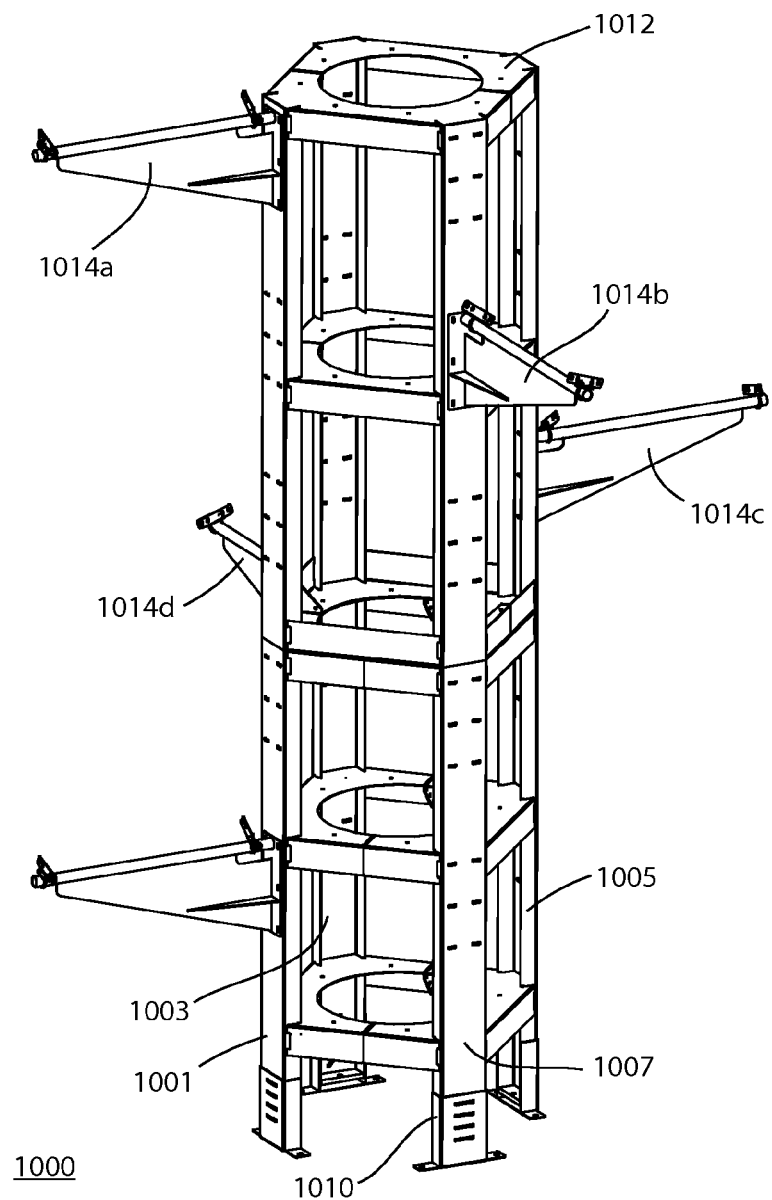
FIG. 10 is a side view illustrating a four support tower structure as used in an embodiment of the invention.

FIG. 10 is a perspective view illustrating details of the tower section 1000. The tower section 1000 is comprised of legs 1001, 1003, 1005, 1007. Each tower leg includes a foot 1010 used for fastening each tower leg to the ground or other fixed structure. A plurality of tower frames 1012 are fastened a predetermined distance within and to each of the tower legs to form a rigid structure having a substantially high weight carrying capacity. Extending from each tower leg are a plurality of mounting arms 1014a, 1014b, 1014c, 1014d which are oriented to extend from on each respective tower leg in a vertically staggered fashion in order to fully support a downwardly spiral chute assembly. As noted herein, each of the mounting arms 1014 are used in connection with a U-bolt and mounting bracket that works to fasten the mounting arm 1014 to both of the inner wall and outer wall of the chute assembly.

Figure 11:
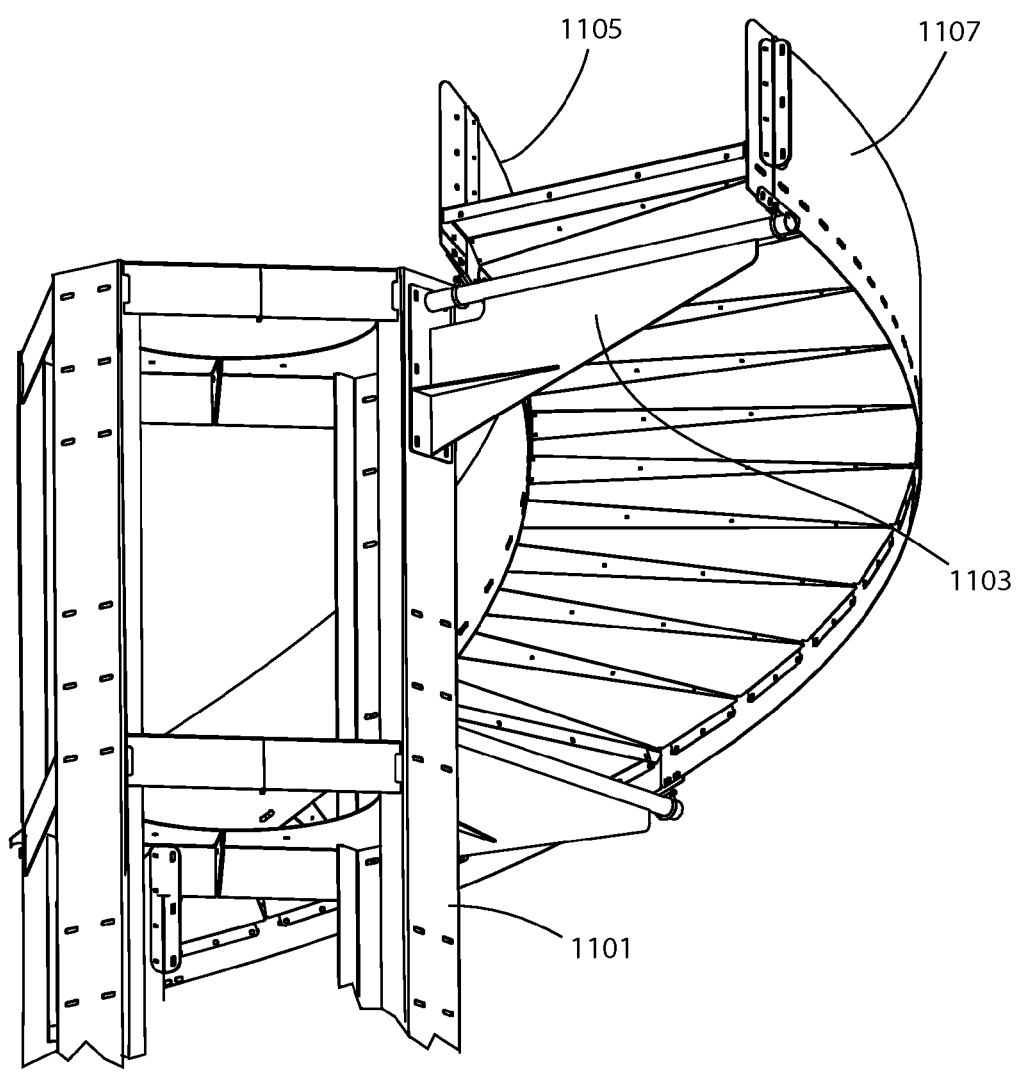
FIG. 11 is a side view illustrating a support bracket assembly as used with the tower structure.

FIG. 11 is a magnified perspective view of the tower section and support arm assembly. The support arm assembly 1100 is shown where the tower leg 1101 is used as a support surface for a mounting arm 1103. The mounting arm 1103 extends substantially perpendicularly from the tower leg 1101 so that a U-bolt can be used in combination with a support bracket to fasten both the inner wall 1105 and the outer wall 1107 to hold the steps spiral chute assembly into a fixed and supported position. As seen in FIG. 11, the support bracket is fastened to the surface of the tower leg 1101 using approximately six screws which extend through holes and/or apertures formed into the surface of the tower leg 1101.

Figure 12:
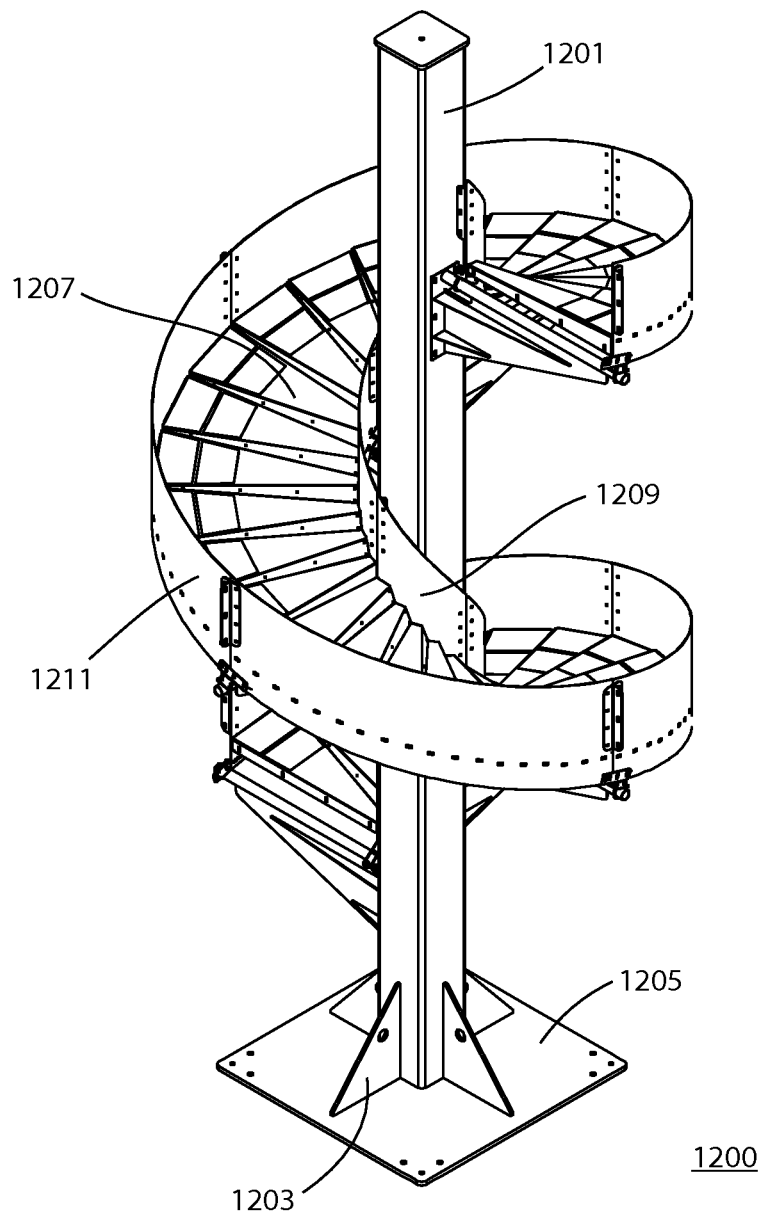
FIG. 12 is a perspective view of 540 degree spiral chute attached to a pole tower structure according to an alternative embodiment of the invention.

FIG. 12 is a perspective view of a 540 degree spiral chute attached to a single pole tower structure according to an alternative embodiment of the invention. The chute having a single pole tower structure 1200 includes a pole 1201 that is substantially square in shape that is has one or more legs 1203 that are fixedly attached to a mounting plate 1205. The pole 1201 and legs 1203 are typically welded to a mounting plate 1205 which can then be attached to the floor at mounting points at its four corners. The chute having a single pole tower structure 1200 offers an advantage of the lattice tower embodiments in that the chute can achieve a tighter turn radius. Moreover, the lattice tower has more components while the pole 1201 is unitary structure requiring little to no assembly. As described herein, the chute includes a plurality of angular chute segments 1207 as well as an inner skirt 1209 and outer skirt 1211 that extend substantially vertically around the sides of the chute segments 1207.

Figure 13:
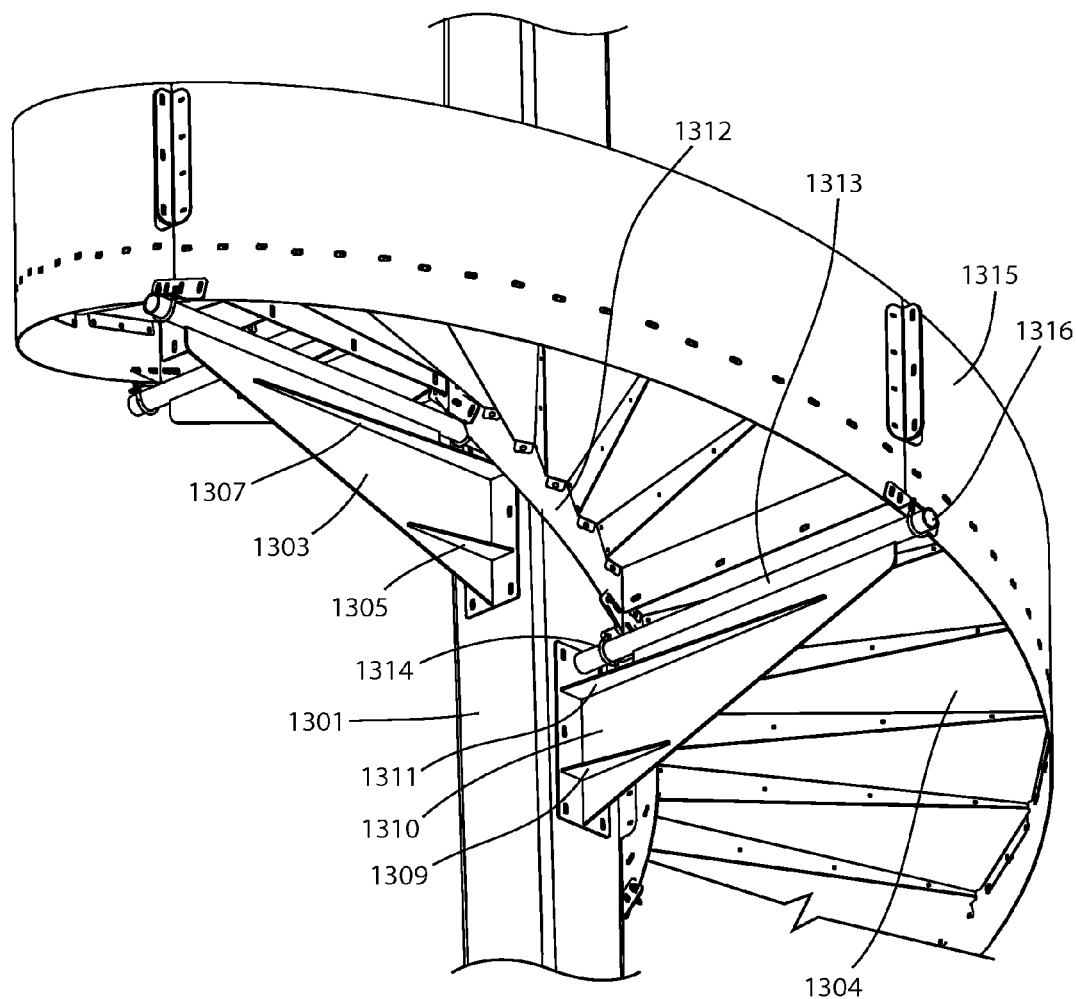
FIG. 13 is a magnified view of a support assembly used in the 540 spiral chute with pole tower structure as seen in FIG. 12.

FIG. 13 is a magnified view of the support assembly used in the 540 spiral chute with pole tower structure as seen in FIG. 12. The support assembly 1300 includes the pole 1301 that has a plurality if brackets 1303 extending from each of the four faces of the pole 1301. The brackets 1303 are staggered vertically moving spirally around the pole 1301 from top to bottom allowing the brackets 1303 to provide support for the chute segments 1304. Each of the brackets 1303 includes a plurality of gussets for providing structural support of the bracket. For example, in FIG. 13, a first gusset 1305 and second gusset 1307 are position on one side of the bracket 1303 while, for example, a third gusset 1309 and fourth gusset 1311 are positioned on the opposite side of the bracket as seen, for example on bracket 1310. A support rod 1313 extends under each of the brackets for increasing integrity of the bracket, for example bracket 1310 mechanically attaches the support rod 1313 to the inner skirt 1312 using a U-bolt 1314 and the outer skirt 1315 using U-bolt 1316.

Figure 14:
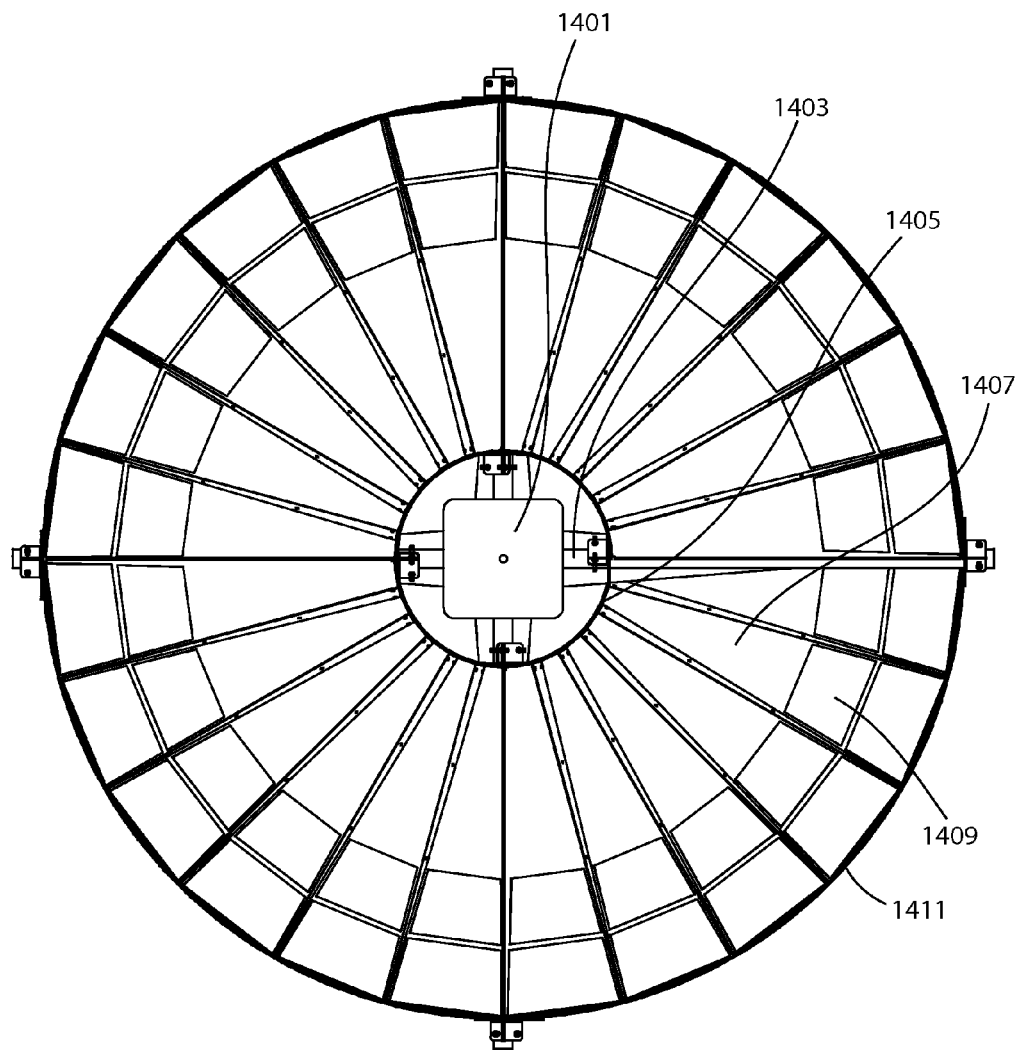
FIG. 14 is a top view of the 540 degree spiral chute as shown in FIG. 12.

FIG. 14 is a top view of the 540 degree spiral chute as shown in FIG. 12. The 540 degree spiral chute with pole tower structure 1400 includes the pole 1401 to which a plurality of support brackets 1403 attached to the sides in a descending spiraling manner. The inner skirt 1405 attached to the bracket as well as the outer skirt 1411. This provides support for chute segments 1407 and panels 1409 as they extend spirally about post 1401.

In use, an article is introduced into the chute system placing it onto upper surface of chute elevated above some destination or exit point. The article starts to slide down the chute surface and, because of the downward slope of the stepped chute segments, the article will tend to slide downwardly and outwardly toward outer skirt. At the same time, the article tends to slide downwardly toward the lower end of the chute system. The combination of the angle of the chute segments relative to their vertical axis tends to cause the articles traveling down chute system to be forced outwardly onto the outer skirt. The article continues to move down the chute and tends to slide at least partially along the skirt until it reaches the end section. The chute design is such that both light and heavy articles will tend to travel down chute system at a controlled and substantially constant velocity. The Durasurf™ plastic panels used in the manufacture of chute segments also reduces the likelihood of articles becoming stuck part-way down the chute. Thus, articles have minimal contact with the chute bottom as they are conveyed since the package or article maintains only tangential contact with the peaked surface as compared to a flat surface. The chute system can be either suspended using cables or affixed to a lattice or single pole tower structure with supporting members attached to the tower section.

Thus, the configuration of the spiraling chute segments form a stepped slider bed that reduces friction since an article moving on the chute touches only the raised points or bend lines of the chute segment. Moreover, the stepped chute system uses a bolt together construction that is easily modified to a desired width. The chute system is designed in 45 degree sections that are configured in a spiraling helix in either a clockwise or counter-clockwise manner. Thus, the chute system can work in configurations to suit 45, 90, 180, 540, 720 etc. increments that can be suspended or built about a center tower or single pole supporting structure.

Similarly, a method for forming a stepped chute system for conveying articles from an upper elevation to a lower elevation within a building includes the steps of; winding a helical chute about a vertical axis such that it is secured at an inner edge and an outer edge by a plurality of support rods. The chute includes a plurality of stepped chute segments that are secured together in a stepped relationship to one another. Each stepped chute segment has an upper wall disposed at a first angle to the vertical axis and sloping downwardly toward the outer wall. Joining a plurality of stepped chute segments together to form a helix that spirals though at least 180 degree and joining at least one flat chute segment to the plurality of stepped chute segments for controlling speed of an article such that the helical chute resembles a stepped spiral staircase. Attaching an inner skirt to the inner surface of the chute for preventing articles from falling from the stepped segments of the chute and attaching an outer skirt to the outer surface of the chute for preventing articles from falling from the stepped segments of the chute. Positioning a plurality of plastic panels along the outer surface of the angular chute segments abutting the outer skirt; and selecting the number of plastic panels on each stepped chute segment dependent on the height of the angular chute segment in the helical chute system such that the number plastic panels per chute segment decreases in surface area as the chute segment descends about the vertical axis.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A helical chute system for conveying articles from an upper elevation to a lower elevation within a building comprising:
    a chute wound about a vertical axis and being secured at both an inner edge and outer edge where a first portion of the chute is comprised of a plurality of angular chute segments secured together in a stepped relationship to one another where each chute segment has a first surface sloping downwardly to a second surface and a second portion of the chute is comprised of at least one substantially flat non-stepped chute segment joining the first portion for controlling speed of a conveying article;
    an inner skirt attached to the inner surface of the chute for preventing articles from falling from the surface of the chute;
    an outer skirt attached to the outer surface of the chute for preventing articles from falling from the surface of the chute;
    a plurality of plastic panels positioned along the outer surface of the angular chute segments abutting the outer skirt; and
    wherein the number of low friction panels that are positioned on each angular chute segment is dependent on the height of the angular chute segment in the helical chute system such that the number panels per chute segment decreases in surface area as the chute segment descends about the vertical axis.

2. A helical chute system as in claim 1, wherein the system is supported by a plurality of support rods.

3. A helical chute system as in claim 1, wherein the system is supported by a lattice tower.

4. A helical chute system as in claim 1, wherein the system is supported by a four sided pole.

5. A chute system for conveying articles from an upper elevation to a lower elevation within a building comprising:
    a helical chute wound about a vertical axis and being secured at an inner edge and an outer edge; wherein the chute comprises a plurality of stepped chute segments secured together in a stepped relationship to one another; each stepped chute segment having an upper wall disposed at a first angle to the vertical axis and sloping downwardly toward the outer wall; wherein a plurality of stepped chute segments are joined together to form a helix;
    an inner skirt attached to the inner surface of the chute for preventing articles from falling from the stepped segments of the chute;
    an outer skirt attached to the outer surface of the chute for preventing articles from falling from the stepped segments of the chute;
    a plurality of plastic panels positioned along the outer surface of the angular chute segments substantially abutting the outer skirt; and
    wherein the number of plastic panels that are positioned on each stepped chute segment varies and is dependent on the height of the angular chute segment in the helical chute system such that the number plastic panels per chute segment decreases in total surface area as the chute segment descends about the vertical axis.

6. A chute system for conveying articles from an upper elevation to a lower elevation within a building comprising:
    a vertical tower having a plurality of support arms extending therefrom;
    a helical chute wound about a vertical axis and being secured at an inner edge and an outer edge to the vertical tower such that the plurality of support arms extends under the helical chute; wherein the chute comprises a plurality of stepped chute segments secured together in a stepped relationship to one another; each stepped chute segment having an upper wall disposed at a first angle to the vertical axis and sloping downwardly toward the outer wall; wherein a plurality of stepped chute segments are joined together to form a helix and at least one flat chute segment joined to the plurality of stepped chute segments for controlling speed of an article such that the helical chute resembles a stepped spiral staircase;
    an inner skirt attached to the inner surface of the chute for preventing articles from falling from the stepped segments of the chute;
    an outer skirt attached to the outer surface of the chute for preventing articles from falling from the stepped segments of the chute;
    a plurality of plastic panels positioned along the outer surface of the angular chute segments abutting the outer skirt; and
    wherein the number of plastic panels that are positioned on each stepped chute segment is dependent on the height of the angular chute segment in the helical chute system such that the number plastic panels per chute segment decreases in surface area as the chute segment descends about the vertical axis.

7. A chute system as in claim 6, wherein the flat chute segment is positioned at the exit end of the chute assembly.

8. A chute system as in claim 6, wherein each of the plurality of support arms attach to a respective tower leg and are oriented at any angular increment, from an adjacent support arm in a spirally descending manner.

9. A chute system as in claim 6, wherein the vertical tower is a lattice structure.

10. A chute system as in claim 6, wherein the vertical tower is a four sided pole.

11. A chute system as in claim 10, wherein each of the plurality of support arms attach to a respective side of the four sided pole and are oriented at 90 degrees from an adjacent support arm in a spirally descending manner.

12. A helical chute system for conveying articles comprising:
- a chute wound about a vertical axis and being secured at both an inner edge and outer edge where a first portion of the chute is comprised of a plurality of angular chute segments secured together in a stepped relationship to one another where each chute segment has a first surface sloping downwardly to a second surface;
- a plurality of low friction plastic panels positioned along an outer surface of the angular chute segments abutting an outer skirt; and
- wherein the number of low friction plastic panels that are positioned on each angular chute segment is dependent on the height of the angular chute segment in the helical chute system such that the number panels per chute segment decreases in surface area as the chute segment descends about the vertical axis.

13. A helical chute system as in claim 12, wherein the system is supported by a plurality of support rods.

14. A helical chute system as in claim 12, wherein the system is supported by a lattice tower.

15. A helical chute system as in claim 12, wherein the system is supported by a pole acting as the vertical axis of the helical chute system.

\* \* \* \* \*